(12) United States Patent
Dries

(10) Patent No.: US 6,658,988 B1
(45) Date of Patent: Dec. 9, 2003

(54) APPARATUS AND PROCESS FOR REMOVING SOLID PARTICLES FROM GASES

(75) Inventor: Hubertus Wilhelmus Albertus Dries, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/979,463

(22) PCT Filed: May 19, 2000

(86) PCT No.: PCT/EP00/04628
§ 371 (c)(1), (2), (4) Date: Nov. 19, 2001

(87) PCT Pub. No.: WO00/71231
PCT Pub. Date: Nov. 30, 2000

(30) Foreign Application Priority Data

May 21, 1999 (EP) .............................................. 99303958

(51) Int. Cl.⁷ .............................................. B01D 46/04
(52) U.S. Cl. .......................... 095/280; 55/283; 55/284; 55/302; 95/278; 95/279
(58) Field of Search .......................... 55/302, 283, 284; 95/278, 279, 280

(56) References Cited

U.S. PATENT DOCUMENTS 4,046,526 A * 9/1977 Phillippi ..................... 55/302
5,275,634 A * 1/1994 Kramer ....................... 55/302
5,328,492 A   7/1994 Zievers et al.
5,948,127 A * 9/1999 Minakawa et al. ........... 55/302

FOREIGN PATENT DOCUMENTS

DE   90 00 579 U    4/1990
EP   0 551 951 A1   7/1993

* cited by examiner

Primary Examiner—Blaine Copenheaver
Assistant Examiner—Minh-Chau T. Pham

(57) ABSTRACT

An apparatus for removing solid particles from a gas containing solid particles, comprising a filter container, a plate provided with openings across the filter container such that the plate divides the container in an upper and lower space and a number of filter elements extending under the openings, wherein a plurality of outlet conduits are present which are in fluid communication with one or more filter elements, said outlet conduits having an outlet opening which is in fluid communication with the upper space and wherein around said outlet conduit a cap is present, which cap is provided with means for supplying backflushing fluid for removing solid particles from said filter elements and wherein the volume between the cap and the outlet conduit is sufficiently large to ensure that predominately only the clean gas between cap and outlet conduit is entrained by the backflushing fluid into the filter element when removing solid particles.

6 Claims, 1 Drawing Sheet

APPARATUS AND PROCESS FOR REMOVING SOLID PARTICLES FROM GASES

BACKGROUND OF THE INVENTION

The present invention relates to an apparatus for removing solid particles from gases. In many industrial processes, particularly elevated or high temperature, high pressure procedures, gaseous streams are obtained containing solid particles which must be removed before the gaseous streams may be used, treated further or released. For example the ordinary combustion of coal produces an effluent gas containing flyash particles which cannot be released into the atmosphere. Similarly, the gasification or partial oxidation of coal often produces a product gas stream which, after bulk removal of solids, contains from 0.1 percent to 4.0 percent by weight, based on the total weight of the gas and solids, of various solid particles which comprise flyslag or flyash and, in some cases, unburned coal. Fluid catalytic cracking (FCC) processes also produce gaseous streams containing catalyst fines which cannot be allowed to contaminate the environment. Other processes which make use of apparatuses to clean gas are Pressurised Fluid Bed Combuster (PFBC) and Intergrated Gasification Combined Cycle (IGCC) coal based power systems.

When filtering hot gases at high temperatures filter elements of a ceramic type of many different embodiments are used today. In one embodiment filters may be composed of a large number of filter elements in a large filter container. This container is provided at its upper part with an outlet for cleaned gases and at its lower part with a collection space for solids separated in the filter and fallen down from the filter elements. Uncleaned gas enters the space below the filter elements at the lower side of the container. The filter elements may be suspended from a plate, provided with openings, in the upper part of the container where the plate supports the individual filter elements. Each opening in the plate is equipped with a filter element suspended below the opening. The filter element, sometimes referred to as filter candles, cleans the gases which flow through the filter element and further out through that opening in the plate which is associated with the respective filter element. The gas above the plate is thus freed from solids and brought to the outlet of the filter container. Solids from the uncleaned gas will adhere to the outside of the different filter elements. These solids will loosen when a gas is brought to pass through the filter elements in reverse direction during periodically recurring cleanings of the filter element, also referred to as backflushing. The solids from the collection space can be discharged at the lower part of the container.

Ceramic materials included in the filter elements of the kind described above have a stochastic composition from the point of view of strength, which is caused by the fact that in each produced ceramic component imperfections exist in the internal structure of the ceramic. This may lead to breakage of the component if it is subjected to stress, for example in the form of temperature transients.

In a filter with many filter elements, sometimes up to 800, there is always a risk that one or more filter elements will break. The consequence of this breakage of the filter element is that a certain part of the gas, that part which passes through the broken filter element, is admitted through this element in uncleaned state. In some applications the loss in separation efficiency due to the fact that only one or a small number of the filter elements break could be acceptable. For example a dust loading of between 2000–20000 ppm at the time of filter failure can be tolerated. The problem however is that solid particles present above the plate, as a result of the failure of one of the filter elements, will enter the downstream or clean end of the non-broken filter elements. Solids will enter the downstream or clean side of the non-broken filter elements due to entrainment the solids by the backflush gas. The solids will foul the clean side of the non-broken filter elements causing them to plug, resulting in that the whole filtering apparatus or filter bank becomes ineffective as filtering means.

Various apparatuses have been described which aim at ensuring that no solids will pass the broken filter elements or a group of elements comprising one or more broken elements. Such apparatuses are for example described in EP-A-551951 and EP-A-642377. No apparatuses have been described which allow some solids to pass the filter container as a whole and simultaneously ensure that the majority of the non-broken filter elements are not plugged by the solids which pass the broken filter elements. The present invention aims at providing such an apparatus.

SUMMARY OF THE INVENTION

The present invention provides an apparatus for filtering solid particles from a fluid containing solid particles, comprising a filter container, a plate provided with openings across the filter container such that the plate divides the container in an upper and lower space and a number of filter elements extending under the openings, wherein a plurality of outlet conduits are present which are in fluid communication with one or more filter elements, said outlet conduits having an outlet opening which is in fluid communication with the upper space and wherein around said outlet conduit a cap is present, which cap is provided with means for supplying a backflushing fluid for removing solid particles from said filter elements and wherein the volume between the cap and the outlet conduit is sufficiently large to ensure that predominately only the clean gas between cap and outlet conduit is entrained by the backflushing fluid into the filter element when removing solid particles.

The present apparatus provides a robust and simple design for filtering solids wherein the pressure drop of the apparatus is low. A further advantage is that the apparatus can be easily integrated into existing filter system designs in terms of seals, gaskets, fixtures and assemblies. Breakage of one or more filter element will not result in that all filter elements become plugged and cease to function as a filtering device. In normal operation the volume between the cap and the outlet conduit will be occupied by the cleaned gas leaving the filter element. This will also be the situation for the caps of the non-broken filter elements when one or more other filter elements break and cease to function as a filtering device and solids accumulate in the upper space. With the present apparatus the chances that these solids enter the non-broken filter elements when the apparatus is regularly backflushed are small. This is because when backflushing only the clean gas which is present between the cap and the filter outlet conduit of the non-broken filter element(s) will be entrained into the 'clean' or downstream side of the non-broken filter element.

DETAILED DESCRIPTION OF THE PREFERRED EMBODIMENTS

Figure 1:
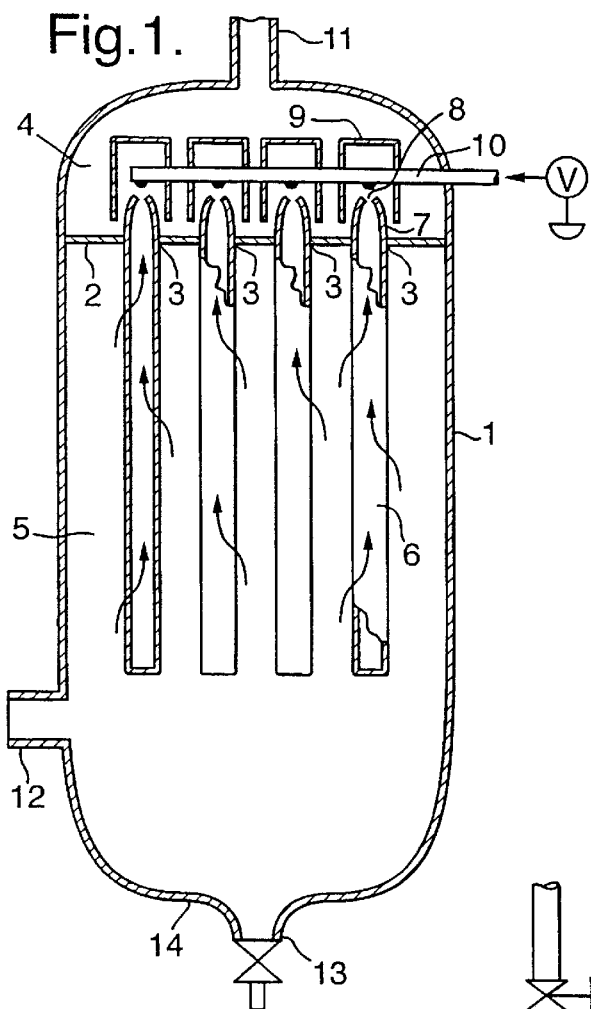
FIG. 1 illustrates a filter apparatus according to the present invention.

FIG. 1 shows an apparatus according to the invention, comprising a filter container (1), a plate (2) provided with openings (3) across the filter container (1). The plate (2) divides the container (1) in an upper (4) and lower (5) space and a number of filter elements (6) extending under the openings (3). A plurality of outlet conduits (7) are present which are in fluid communication with one or more of the filter elements (6). The outlet conduits (7) have an outlet opening (8) which is in fluid communication with the upper space (4). Around said outlet conduit (7) a cap (9) is present. Cap (9) is provided with means (10) for supplying a backflushing fluid for removing solid particles from said filter elements (6). The volume between the cap and the outlet conduit (7) is sufficiently large to ensure that predominately only the clean gas present between cap (9) and outlet conduit (7) is entrained by the backflushing fluid into the filter element (6) when removing solid particles. The container (1) is further provided with a gas outlet conduit (11) to discharge the cleaned gas from the upper space (4) and an gas inlet conduit (12) to supply the gas-solids mixture to lower space (5). The container (1) is also equipped with a solids outlet opening (13) at the lower end (14) of the lower space (5).

The outlet conduit (7) preferably has an outlet opening (8) directed in an upwardly direction. The cap (9) preferably has an opening in a downwardly direction. The height and diameter of the cap should be sufficiently large to accommodate a volume of gas that will be entrained into the clean side of the filter element when the filter element is backflushed. The cap may have a tube shape which is closed at the top and open at the bottom. The closed end is preferably provided with means (10) for backflushing, wherein means (10) are so placed that the direction of the backflushing gas is such that it easily enters the clean side of the filter element.

The filter elements are suitably vertically placed hollow tubes which are closed at the lower end protruding in the lower space (5) of the filter container (1) and open at the upper end to allow the clean gas to enter the upper space (4) of the filter container (1). These elements (6) are sometimes referred to as filter candles.

Figure 2:
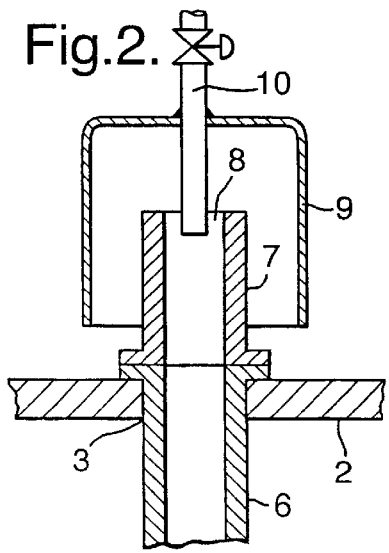
FIG. 2 shows a detail of the outlet conduit and cap in a possible embodiment of the invention.

FIG. 2 shows a detail of the gas outlet conduit showing the upper end of a filter element (6) in fluid communication with the outlet conduit (7) protruding plate (2) through opening (3). Around conduit (7) a cap (9) is present provided with means (10) to supply backflushing gas. The direction of the backflushing gas outlet of means (10) must be located so that the gas is directed into the filter element. An example of a backflushing gas is nitrogen.

Figure 3:
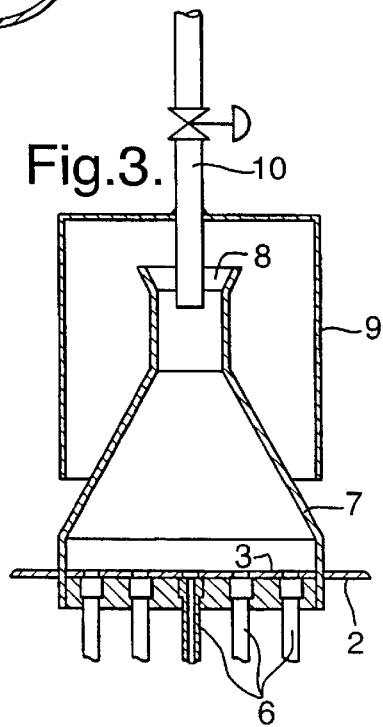
FIG. 3 shows an embodiment in which several filter elements are in fluid communication with one outlet conduit and associated cap.

FIG. 3 shows an embodiments in which five filter elements (6) are in fluid communication with one outlet conduit (7). Around outlet conduit (7) a cap (9) is present provided with means (10) to supply backflushing gas. In order to arrive at the benefits of the present invention it will be apparent that a filter container will have more than one outlet conduits (7) and its associated filter elements (6). Embodiments in which 2–60 filter elements (6) are combined with one outlet conduit (7) are possible.

In the above description of the filter container it appears that the orientation of the filter container, filter means and plate has the orientation as presented in FIG. 1. It must be understood that the advantages of the invention are also obtained when the apparatus is used under an angle to even horizontally oriented in which the plate is placed vertically and the upper space (4) and lower space (5) are located next to each other.

The particular type of filter element or elements employed in the invention is a matter of choice. However, the invention is particularly adapted to high temperature use. Thus, the primary filter element or filter elements employed may be composed or constructed of material suitable for pressure or vacuum service which may include high temperature service. "High temperature service" in the context of the invention, refers to temperatures of perhaps 100° C. to 1500° C., advantageously 200° C. to 650° C. The operating pressure may be between 1 to 50 bars or greater. In general, a cylindrically-shaped filter element made of rigid or flexible, felted or non-felted, multiple or single layer material fabric or porous, monolithic (ceramic, metal, or plastic) substances may be used. The spacing between the filter elements is a function of the particulate concentration of the fluid-particulate mixture.

The invention is also related to the following process: Process for removing solid particles from a gas containing solid particles, by alternately passing (a) the gas from an upstream space over a plurality of filter elements to a downstream space via an outlet opening of the filter elements fluidly communicating with said downstream space, and (b) supplying a backflushing fluid to the outlet opening of an individual filter element, wherein the backflushing fluid entrains part of the cleaned gas obtained in said filter element in step (a) before passing the individual filter element to the upstream space thereby removing solid particles from said filter element.

In case of the failure of one individual filter element in the above process more solids will be present in the downstream space. This will however not result in that more solids will enter still functioning filter elements from the downstream space when backflushing. This is because only gas will be entrained by the backflushing fluid which has just passed said still functioning filter element. Preferred conditions of the process are as described in this specification. Preferably the above process is performed in the apparatus according to the invention, wherein the upstream part corresponds with the lower space and the downstream part corresponds with the upper space of said apparatus.

The gas chemistry can either be oxidizing, as for example in a PFBC process or reducing, as for example in a IGCC process. The nominal gas flow through one filter element, i.e. filter candle, is preferably between 10–100 actual cubic foot per min.

The apparatuses according to the invention can be suitably used to remove solids, for example char, from gaseous process streams containing for example up to 4 percent by weight of solids to obtain a cleaned gas containing preferably between 0 and 2 ppm. Suitable processes in which the apparatus can be used are Fluidized Catalytic Cracking (FCC) processes, Coal Gasification processes, Pressurised Fluid Bed Combuster (PFBC) and Intergrated Gasification Combined Cycle (IGCC) coal based power systems.

What is claimed is:

1. An apparatus for removing solid particles from a gas containing solid particles, comprising a filter container, a plate provided with openings across the filter container such that the plate divides the container in an upper and lower space and a number of filter elements extending under the openings, wherein a plurality of outlet conduits are present which are in fluid communication with one or more filter elements, said outlet conduits having an outlet opening which is in fluid communication with the upper space and wherein around said outlet conduit a cap is present, which cap is provided with means for supplying a backflushing fluid for removing solid particles from said filter elements and wherein the cap and the outlet conduit defines a volume between the cap and the outlet conduit for accommodating the backflushing fluid so as to introduce the backflushing fluid into the filter element when removing solid particles.

2. An apparatus as recited in claim 1, further comprising:

a gas outlet conduit that is in fluid communication with said upper space and provides for the discharge of cleaned gas from said upper space; and a gas inlet conduit that is in fluid communication with said lower space and provides for the supply of said gas containing solid particles to said lower space.

3. An apparatus as recited in claim 2, further comprising:

a solids outlet opening that is in fluid communication with said lower space.

4. A process for removing solid particles from a gas containing solid particles, said process comprising:

providing an apparatus comprising a filter container, a plate provided with openings across the filter container such that the plate divides the container in an upper and lower space and a number of filter elements extending under the openings, wherein a plurality of outlet conduits are present which are in fluid communication with one or more filter elements, said outlet conduits having an outlet opening which is in fluid communication with the upper space and wherein around said outlet conduit a cap is present, which cap is provided with means for supplying a backflushing fluid for removing solid particles from said filter elements and wherein the cap and the outlet conduit defines a volume between the cap and the outlet conduit for accommodating the backflushing fluid so as to introduce the backflushing fluid into the filter element when removing solid particles, a gas outlet conduit that is in fluid communication with said upper space and provides for the discharge of a cleaned gas from said upper space, and a gas inlet conduit that is in fluid communication with said lower space and provides for the supply of said gas containing solid particles to said lower space; and introducing said gas containing solid particles through said gas inlet conduit; and discharging said cleaned gas from said upper space.

5. A process as recited in claim 4, further comprising:

stopping the introduction of said gas containing solid particles; and introducing said backflushing fluid through said means for supplying a backflushing fluid.

6. A process as recited in claim 5, further comprising:

removing solid particles through said solids outlet opening.

* * * * *